United States Patent Office 3,498,751
Patented Mar. 3, 1970

3,498,751
DETECTOR FOR PRESENCE OF HALOGEN ION IN FUEL
James E. Newhart, R.D. 3, Fell Road, Doylestown, Pa. 18901, and Michael F. Kozempel, 5204 Crestwood Drive, Clifton Heights, Pa. 19018
No Drawing. Filed Sept. 29, 1967, Ser. No. 671,893
Int. Cl. G01n *31/22, 33/22;* C09k *1/06*
U.S. Cl. 23—230                                                                6 Claims

ABSTRACT OF THE DISCLOSURE

A reagent indicator suitable for field use for halogen ions in hydrocarbon oil products which includes an intermixture of Clayton Yellow and silver nitrate on a millipore absorbant pad.

---

The present invention relates to a novel and improved method and apparatus for detecting the present of halogen ions in distillate fuels derived from petroleum oils.

Contamination of aircraft gas turbine engine fuels with sea water invariably leads to corrosion of critical engine components and ultimately to serious engine fuel control problems. Removal and replacement of the engine is often necessary in order to completely remedy the situation. It is therefore often necessary and desirable to be able to periodically test the aircraft fuel in the field for the presence of sea water. Presently, various types of free water detectors are used in the field to determine the presence of water in the fuel, but none of the same are able to distinguish between fresh water and sea water. Although up to five parts per million of fresh water can be tolerated in the fuel, no amount of sea water can be allowed therein.

It is therefore a principal object of the invention to provide a novel and improved method and apparatus for detecting the presence of halogen ions in hydrocarbon fuels derived from petroleum oils.

It is a further object of the invention to provide a novel and improved method and apparatus for detecting the presence of salt water in aircraft gas turbine engine fuels in the field.

It is a further object of the invention to provide a novel and improved method and apparatus for detecting the presence of salt water in aircraft gas turbine engine fuels wherein the interfering effect of sulfate and other ions is neutralized.

These and other objects of the invention are accomplished by preparing an indicator reagent emulsion which includes silver nitrate, Clayton Yellow, which has a Colour Index Reference Number of 19540, mercuric nitrate and distilled water. The reagent emulsion is then sprayed on a millipore absorbent pad with a conventional jet spray device that deposits a uniform coating on the surface of the pad. In testing for the presence or absence of salt water in the gas turbine fuel, approximately 500 milliliters of the fuel is filtered through the pad and the pad is observed for a color change either with the naked eye or under ultraviolet light. Quantitative determinations are made by comparing the intensity of the color change with a set of standard pads treated with known concentrations of sea water.

Before use, the indicator reagent impregnated pads are orange in color to the naked eye and dark under the ultraviolet lamp. When exposed to salt water, the pads begin to appear yellow to the naked eye and fluorescent orange spots appear when viewed under the ultraviolet lamp. At concentrations of 5 p.p.m., only a few spots appear. At 10 p.p.m., the number of spots multiply substantially and appear considerably larger in size. At 20 p.p.m., the entire surface of the pad is nearly entirely fluorescent orange.

In theory, the above indicated changes of color of the detector pads of the invention appear to be produced in the following manner. When the sulfate ion masking agent ($Hg(NO_3)_2$), is not included as one of the ingredients of the indicator reagent, the Clayton Yellow adsorbs the silver ion. The adsorbed silver ion partially filters out or softens, but does not eliminate the natural bluish-white fluorescence of the Clayton Yellow when it is viewed under the ultraviolet lamp. When the chlorine ion comes into contact with the detector pad, the silver and chloride ions react to form silver chloride and the exposed Clayton Yellow appears bluish-white under the ultraviolet light. When sulfate ions in the fuel to be tested contact the detector pad, the silver and sulfate ions react to form silver sulfate and the Clayton Yellow appears bluish-white as if it were a chloride ion triggering the color change. When the mercuric nitrate is included as an ingredient of the indicator reagent, mercuric ions form a thin transparent coating over the silver ions on the detector pad. The mercuric ions provide a barrier for any sulfate ions in the fuel to be tested by reacting with them and forming mercuric sulfate. The chloride ions in the fuel, however, pass through the mercuric ion layer and react with the silver ions to form silver chloride and expose the Clayton Yellow under the ultraviolet light which now appears orange instead of bluish-white.

The following example of the preparation of the indicator reagent impregnated detector pads used in the practice of the present invention is intended to illustrate the same but not to limit it in any way.

EXAMPLE

Four parts of 2.6 grams of Clayton Yellow per liter of distilled water were mixed and stirred thoroughly with one part of a 0.1 normal solution of silver nitrate and five parts of distilled water. Ten parts of saturated mercuric nitrate were then added and the entire intermixture was stirred thoroughly. The red suspended particles of the resulting reagent indicator were then sprayed on the detector pads for 1.8 seconds using a conventional jet spray device at a distance of 10 inches. The pads were then dried for 45 minutes at 190° F.

Tests of detector pads prepared in the manner indicated above revealed that as little as 5 p.p.m. of salt water in fuel could readily be detected. Normal amounts of salt in so-called fresh water, however, produced no color change indication. Similarly, tests showed that the presence in the fuel of sulfate ions and other ions that precipitate silver ions from water solution produced no detecto pad indication.

While the present invention has been illustrated hereinabove in connection with the test for the presence of salt water in aviation gas turbine fuels, it is to be understood that the invention applies broadly to the test for halogen ions in solvents, gasolines, kerosenes, heating oils and a wide variety of other hydrocarbon oil products of similar properties. The only limitations intended are those contained in the appended claims.

What is claimed is:
1. Device for detecting the presence of halogen ions in distillate fuels comprising:
   (a) a porous matted material; and
   (b) a reagent indicator dispersed on the matted material, said indicator consisting of four parts of 2.6 grams of Clayton Yellow per liter of distilled water, one part of a .1 normal solution of silver nitrate and five parts of distilled water.
2. The device substantially as described in claim 1 wherein the reagent indicator also includes ten parts of saturated mercuric nitrate.

3. The method of detecting the presence of halogen ions in distillate fuels, said method comprising the steps of:
 (a) preparing a reagent indicator consisting of four parts of 2.6 grams of Clayton Yellow per liter of distilled water, one part of a .1 normal solution of silver nitrate and five parts of distilled water;
 (b) spraying the reagent indicator on a porous matted material;
 (c) removing the moisture from the reagent indicator impregnated matted material;
 (d) passing a predetermined amount of the distillate fuel through the impregnated matted material;
 (e) and noting the change in color of the matted material.

4. The method substantially as described in claim 3 wherein preparation of the reagent indicator further includes the addition of a material that acts as a barrier to sulfate ions by forming mercuric sulfate with interfering sulfate ions from the fuel.

5. The method substantially as described in claim 3 wherein preparation of the reagent indicator further includes the addition of ten parts of saturated mercuric nitrate.

6. The method substantially as described in claim 3 wherein the change in color of the matted material is noted under ultraviolet light.

References Cited

UNITED STATES PATENTS 3,202,483   8/1965   McKeon et al. _____ 23—230

OTHER REFERENCES

Colour Index, vol. 2, p. 2007, vol. 3, p. 3121 (1957).

Van Wesemael: J. Ch., Chemical Abstracts, vol. 56 pp. 17–18 (1962).

Negoiu, D., et al.: Chemical Abstracts, vol. 60, p. 13870 (1964).

Shestakovia, N.M., et al.: Chemical Abstracts, vol. 55, p. 2069 (1961).

Granatelli, L.: Chemical Abstracts, vol. 51, p. 6129 (1957).

MORRIS O. WOLK, Primary Examiner

E. A. KATZ, Assistant Examiner

U.S. Cl. X.R.

23—253; 252—408